US008033049B2

(12) United States Patent
St. Clair et al.

(10) Patent No.: US 8,033,049 B2
(45) Date of Patent: Oct. 11, 2011

(54) FLORAL ARRANGEMENT RENDERING AN IMAGE AND APPLICATIONS THEREOF

(75) Inventors: Edward St. Clair, Montreal (CA);
Frank G. McGrath, Saint-Lambert (CA)

(73) Assignee: Ecomedia Advertising Inc., Montreal, Quebec (CA)

( * ) Notice: Subject to any disclaimer, the term of this patent is extended or adjusted under 35 U.S.C. 154(b) by 928 days.

(21) Appl. No.: 11/584,226

(22) Filed: Oct. 20, 2006

(65) Prior Publication Data
US 2008/0092441 A1 Apr. 24, 2008

(51) Int. Cl.
*A01G 9/02* (2006.01)
(52) U.S. Cl. .............. 47/65.9; 47/66.6; 47/86
(58) Field of Classification Search ............. 47/9, 33, 47/65, 65.5, 65.7, 65.9, 66.1, 66.6, 66.7, 47/86, 87, 41.01, 41.1, 41.12, 41.13, 41.14, 47/41.15
See application file for complete search history.

(56) References Cited

U.S. PATENT DOCUMENTS

| 3,992,812 | A | * | 11/1976 | Horowitz | 47/45 |
| 4,118,892 | A | * | 10/1978 | Nakamura et al. | 47/65.9 |
| 4,135,330 | A | * | 1/1979 | Aoyama | 47/1.01 F |
| 5,395,244 | A | * | 3/1995 | O'Neill | 434/151 |
| 5,588,253 | A | * | 12/1996 | Boodley et al. | 47/41.12 |
| 6,751,903 | B2 | | 6/2004 | Shryock | |
| 6,862,842 | B2 | * | 3/2005 | Mischo | 47/65.9 |
| 2002/0007593 | A1 | * | 1/2002 | Mischo | 47/86 |
| 2005/0246951 | A1 | * | 11/2005 | Taylor | 47/41.1 |
| 2006/0064314 | A1 | | 3/2006 | Levin et al. | |

FOREIGN PATENT DOCUMENTS

| EP | 0857415 A1 * | 12/1998 |
| GB | 2 238 472 A | 6/1991 |
| JP | 09204466 A | 8/1997 |
| JP | 2001-327222 | 11/2001 |
| JP | 2001327222 A | 11/2001 |
| JP | 2001327222 A | 11/2001 |
| JP | 2002117243 A | 4/2002 |
| WO | PCT/CA2006/001727 | 5/2007 |

OTHER PUBLICATIONS

Floral Alternatives—Logo flowers showcase your company, Fabric Flowers, The Lasting Alternative, http://www.floralalternatives.com/fnlogo.htm, 1 page, copyright 2004.
Office Action for CN 200680056169.2, issued Aug. 19, 2010.

* cited by examiner

*Primary Examiner* — T. Nguyen
(74) *Attorney, Agent, or Firm* — RatnerPrestia

(57) ABSTRACT

A floral arrangement rendering an image and usable in various applications, including advertisement applications, notification applications and decoration applications. The floral arrangement may comprise a plurality of modules. Each module renders a portion of the image and comprises: a plurality of grown plants forming image elements that collectively make up the portion of the image rendered by that module; a sustaining medium for the grown plants; and a holding component holding the sustaining medium and the grown plants. The modules are arranged such that the portions of the image rendered by the modules are visually combined to compose the image. Also disclosed are a process and a system for creating such a floral arrangement.

151 Claims, 9 Drawing Sheets

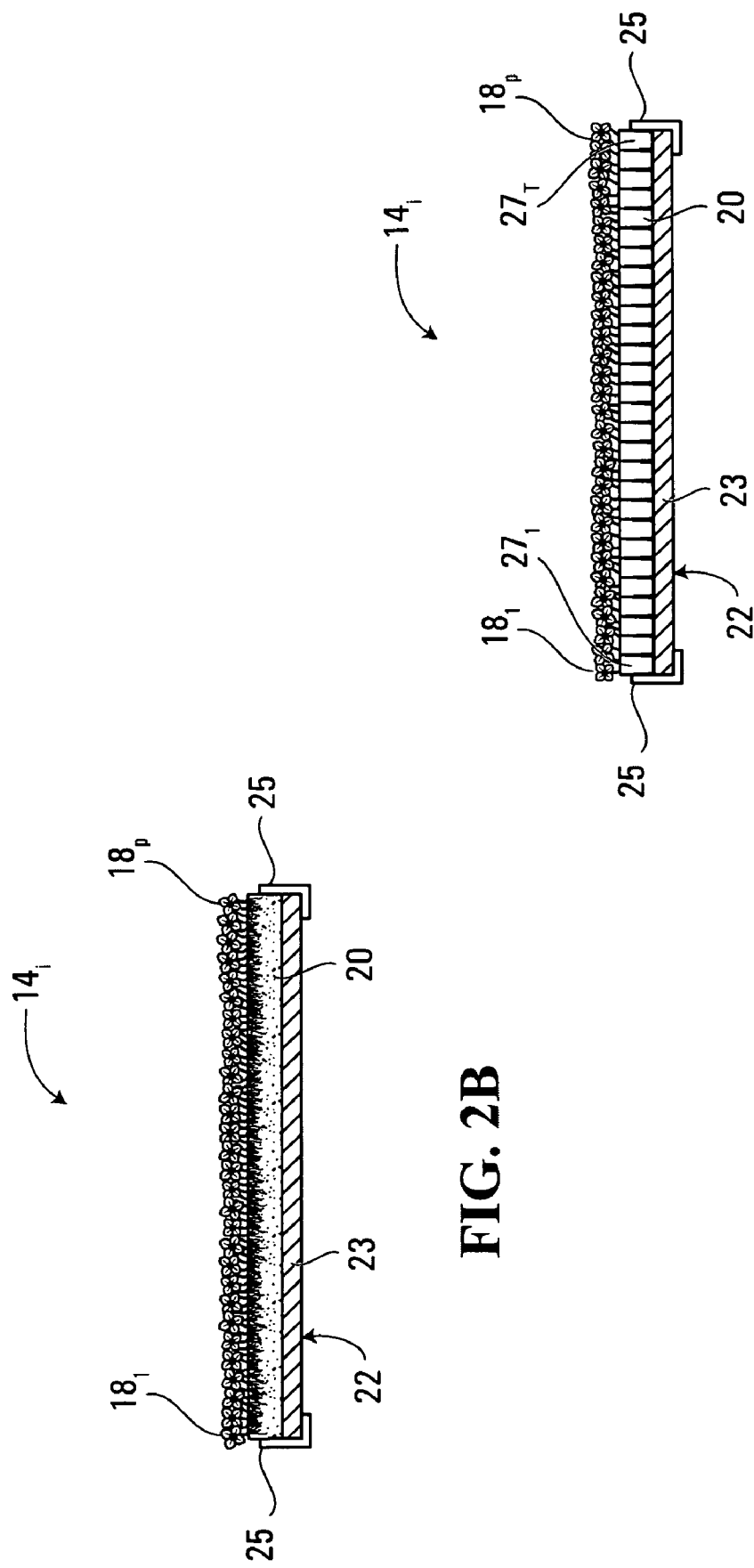

FLORAL ARRANGEMENT RENDERING AN IMAGE AND APPLICATIONS THEREOF

FIELD OF THE INVENTION

The present invention relates to a floral arrangement rendering an image, a process and a system for creating such a floral arrangement, and various applications in which such a floral arrangement may be used.

BACKGROUND

A site is sometimes provided with a floral arrangement comprising a bed of soil supporting flowers and/or other plants configured to render a desired image. The desired image is typically used to decorate the site and/or to convey information about the site (e.g., a name of a city, country or other region in which the site is located).

Creation of such a floral arrangement usually requires skilled workers relying on their experience to plant seeds, seedlings, flowers, and/or other plants in a certain configuration in a bed of soil at a given site in an attempt to eventually obtain a desired image. Requirements for skilled workers result in existing floral arrangements being relatively challenging to set up and thus of limited popularity.

There is therefore a need for improvements directed to floral arrangements rendering images and to creation of such floral arrangements.

SUMMARY OF THE INVENTION

According to a first broad aspect, the present invention provides a modular floral arrangement rendering an image. The modular floral arrangement comprises a plurality of modules. Each module renders a portion of the image and comprises: a plurality of grown plants forming image elements that collectively make up the portion of the image rendered by that module; a sustaining medium for the grown plants; and a holding component holding the sustaining medium and the grown plants. The modules are arranged such that the portions of the image rendered by the modules are visually combined to compose the image.

According to a second broad aspect, the present invention provides, in combination, a plurality of modules for assembly into a modular floral arrangement rendering an image. Each module renders a portion of the image and comprises: a plurality of grown plants forming image elements that collectively make up the portion of the image rendered by that module; a sustaining medium for the grown plants; and a holding component holding the sustaining medium and the grown plants. The modules are capable of being arranged such that the portions of the image rendered by the modules are visually combined to compose the image.

According to a third broad aspect, the present invention provides a method comprising: obtaining an original image; producing a plurality of modules for assembly into a modular floral arrangement rendering an image that corresponds to the original image, each module rendering a portion of the image and comprising a plurality of grown plants forming image elements that collectively make up the portion of the image rendered by that module; and transporting the modules to a site where the modular floral arrangement is to be assembled.

According to a fourth broad aspect, the present invention provides a method comprising: obtaining an original image; and generating information regarding a plurality of modules that are to be provided to make a modular floral arrangement rendering an image that corresponds to the original image, the information being indicative of a plurality of grown plants to be included in each module and of a configuration of the grown plants in each module such that each module renders a portion of the image.

According to a fifth broad aspect, the present invention provides a floral arrangement design entity. The floral arrangement design entity comprises an input for receiving data regarding an original image and a processing unit communicatively coupled to the input. The processing unit is operative for processing the data regarding the original image to generate information regarding a plurality of modules that are to be provided to make a modular floral arrangement rendering an image that corresponds to the original image, the information being indicative of a plurality of grown plants to be included in each module and of a configuration of the grown plants in each module such that each module renders a portion of the image.

According to a sixth broad aspect, the present invention provides a computer-readable storage medium comprising a program element for execution by a computing device to implement a floral arrangement design entity. The program element comprises program code means for receiving data regarding an original image. The program element also comprises program code means for processing the data regarding the original image to generate information regarding a plurality of modules that are to be provided to make a modular floral arrangement rendering an image that corresponds to the original image, the information being indicative of a plurality of grown plants to be included in each module and of a configuration of the grown plants in each module such that each module renders a portion of the image.

According to a seventh broad aspect, the present invention provides a method comprising: obtaining an original image to which an image rendered by a floral arrangement is to correspond, wherein the floral arrangement is to be viewed from an oblique viewing perspective; electronically processing the original image to create a processed image to attempt compensating for an apparent change in dimension of the floral arrangement due to the oblique viewing perspective; and using the processed image to create the floral arrangement.

According to an eighth broad aspect, the present invention provides a floral arrangement design entity. The floral arrangement design entity comprises an input for receiving data regarding an original image to which an image rendered by a floral arrangement is to correspond, wherein the floral arrangement is to be viewed from an oblique viewing perspective. The floral arrangement design entity also comprises a processing unit communicatively coupled to the input. The processing unit is operative for: processing the data regarding the original image to generate data regarding a modified image to attempt compensating for an apparent change in dimension of the floral arrangement due to the oblique viewing perspective; and processing the data regarding the modified image to generate information regarding the floral arrangement.

According to a ninth broad aspect, the present invention provides a computer-readable storage medium comprising a program element for execution by a computing device to implement a floral arrangement design entity The program element comprises: program code means for receiving data regarding an original image to which an image rendered by a floral arrangement is to correspond, wherein the floral arrangement is to be viewed from an oblique viewing perspective; program code means for processing the data regarding the original image to generate data regarding a modified image to attempt compensating for an apparent change in dimension of the floral arrangement due to the oblique viewing perspective; and program code means for processing the data regarding the modified image to generate information regarding the floral arrangement.

According to a tenth broad aspect, the present invention provides a method comprising: placing at a site a floral arrangement rendering an image; and compensating a party that permits placement of the floral arrangement at the site, the compensating comprising committing to cause performance of an action on at least one of the floral arrangement and an area associated with the floral arrangement.

These and other aspects and features of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided herein below, by way of example only, with reference to the accompanying drawings in which:

FIGS. 2B and 2C diagrammatically illustrate cross-sections of variants of each of the modules shown in FIG. 2A;

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
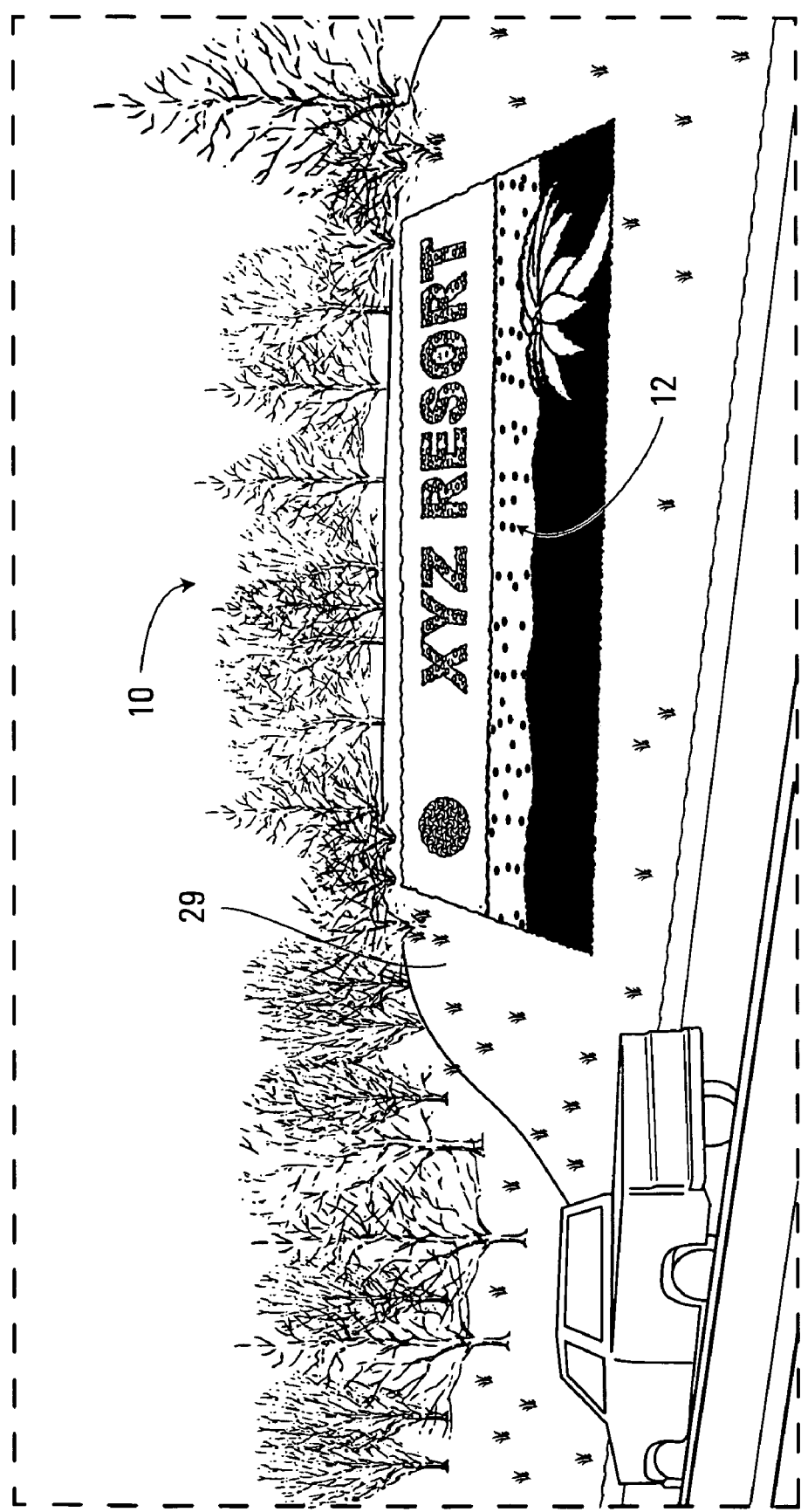
FIG. 1 shows an example of a floral arrangement rendering an image, in accordance with an embodiment of the present invention.
Figure 2A:
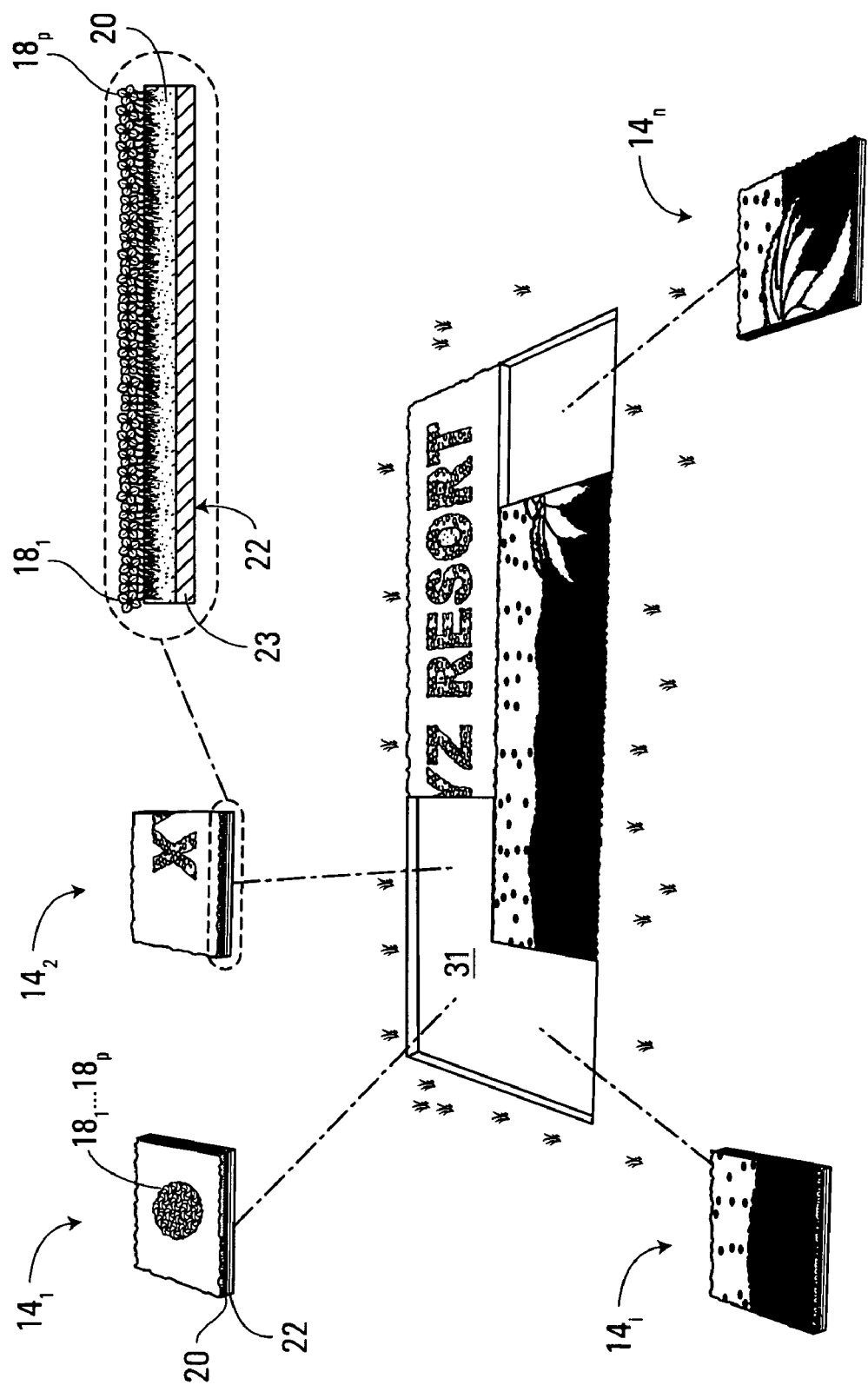
FIG. 2A shows a plurality of modules of the floral arrangement shown in FIG. 1, with an insert diagrammatically illustrating a cross-section of one of the modules.

FIG. 1 illustrates an example of a floral arrangement 10 rendering an image 12, in accordance with an embodiment of the present invention. While a specific example of the image 12 is shown in FIG. 1, the image 12 can be any desired image. For example, the image 12 may include a floral representation of: one or more alphanumeric characters that may form text (e.g., a word, a message, etc.); one or more symbols (e.g., a logo, a sign, an emblem, etc.); one or more patterns or shapes; and/or one or more real or imaginary objects (e.g., a person, a vehicle, a computer, a work of art, a fruit, a flame, a lightning bolt, an imaginary character, a ghost, or any other real or imaginary thing).

In the example of implementation shown in FIG. 1, the floral arrangement 10 is used in an advertisement application, the image 12 having an advertisement function.

More particularly, in this example, the image 12 conveys an advertisement for a resort named "XYZ Resort". The image 12 includes a floral representation of the resort's name and several objects, including a beach portion, a palm tree, water, the sky, and the sun, which may be suggestive of an example of an environment enjoyable during a stay at the resort.

In other examples, the image 12 may convey an advertisement for any desired organization (e.g., an enterprise, a political party, etc), product (i.e., a good or a service), event (e.g., a concert, a convention, etc.), site (e.g., a mall, a museum, etc), etc., and may include any desired advertisement content. For instance, in some cases, the image 12 may serve as an advertisement for a given enterprise and may include a floral representation of that given enterprise's name and/or logo. In other cases, the image 12 may serve as an advertisement for a given product (e.g., a vehicle, a television, a cosmetic preparation, etc.) and may include a floral representation of that given product and/or of its name.

Also, in certain examples, the floral arrangement 10 may be used in conjunction with a more traditional advertisement vehicle (e.g., a panel, billboard or other separate element) that is located adjacent to the floral arrangement 10. For instance, in the example shown in FIG. 1, the floral representation of the resort's name could be omitted from the image 12 and the resort's name and possibly other information (e.g., contact information for the resort such as an address, a telephone number, a web site, etc.) could be included as advertisement content of a panel, billboard, or other separate element located adjacent to the floral arrangement 10. In that case, the image 12 (which, in this example, would include only a floral representation of the beach portion, the palm tree, water, the sky, and the sun) would not explicitly convey an advertisement in and of itself, but there would be a visual association between the image 12 and the advertisement content (in this example, the resort's name and possibly other information) of the panel, billboard, or other separate element located adjacent to the floral arrangement 10.

Continuing with FIG. 1, in this embodiment, the floral arrangement 10 is located adjacent to a pathway. More particularly, in this example, the pathway is a road (e.g., a highway, a street, etc.). In other examples, the floral arrangement 10 may be located adjacent to any other pathway (e.g., an airport runway, a port waterway, a railway, etc.). This enables viewing of the image 12 by individuals moving relative to the road or other pathway (e.g., occupants of vehicles moving along the road, passengers and crew members of aircrafts moving along, approaching, or moving away from the airport runway, etc.).

Figure 3:
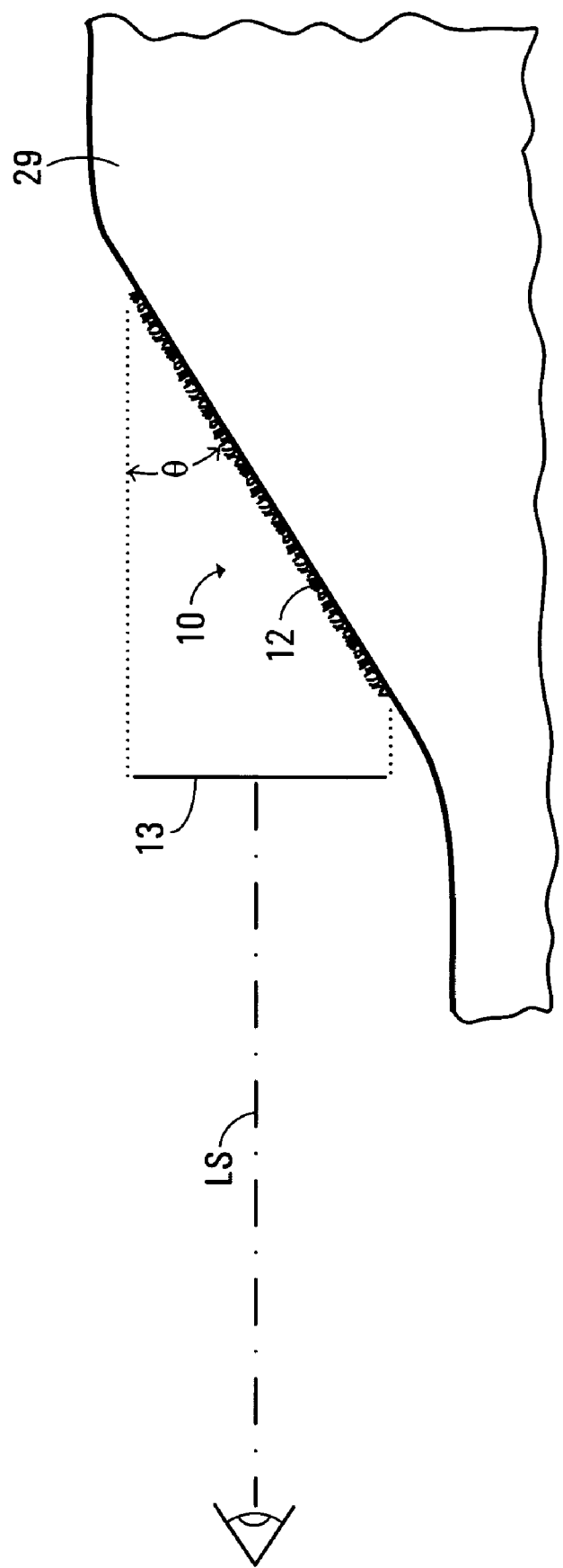
FIG. 3 is a diagrammatic side view of the floral arrangement shown in FIG. 1, illustrating a projected image that is viewable by an individual looking at the floral arrangement along an expected line of sight.

In order to be structurally stable and enable or facilitate viewing of the image 12 by individuals moving along the road, in this embodiment, the floral arrangement 10 is inclined relative to the road's surface. As shown in FIG. 3 and as further described later on, in some embodiments, the floral arrangement 10 may be created such that the image 12 is a "stretched" version of a "projected" image 13 that is viewable by an individual looking at the floral arrangement 10 along an expected line of sight LS. An "expected line of sight" LS is an imaginary straight line along which an individual is expected to look at the floral arrangement 10 when the floral arrangement 10 is set up at its intended location (in this case, when the floral arrangement 10 is set up in its inclined position adjacent to the road). The projected image 13 corresponds to a projection of the image 12 in a plane normal to the expected line of sight LS.

While in this case only the floral arrangement 10 is shown as being present adjacent to the road, in other cases, the floral arrangement 10 may be one of a plurality of floral arrangements serially disposed along and adjacent to the road or other pathway, where each other floral arrangement is similar in construction to the floral arrangement 10 and renders a respective image that is used in an advertisement context.

Although the above-described embodiments relate to location of the floral arrangement 10 adjacent to a road or other pathway, it is to be understood that the floral arrangement 10 may be located at any desired location. For example, in various embodiments, the floral arrangement 10 may be located in or adjacent to a building (e.g., a corporate headquarter, a house, a public establishment, etc.), a park, a field, or any other place. In some embodiments, the floral arrangement 10 may be located so as to be visible to individuals moving on foot or in moving vehicles such as land vehicles, aircrafts and watercrafts. For instance, the floral arrangement 10 may be located at an airport area or any other area so as to be visible to individuals in a flying aircraft.

Also, while in the aforementioned embodiments the floral arrangement 10 is used in an advertisement application, it is to be understood that, in other embodiments, the floral arrangement 10 may be used in various other applications, such as notification applications and decoration applications. For example, in some embodiments, the floral arrangement 10 may be located in, at a boundary of, or proximate to a particular place (e.g., a city, a country, a building such as a corporate headquarter or a residential building, etc.) and the image 12 may include a floral representation of a name, a flag, a logo, and/or any other object(s) associated with that particular place. For instance, the floral arrangement 10 may be located at a border of a country (e.g., Canada) and the image 12 may include a floral representation of a message that provides a notification of entrance into that country (e.g., "Welcome to Canada"). In other embodiments, the floral arrangement 10 may be used in a decoration application, where the image 12 is used to decorate a particular site (e.g., surroundings or an interior area of a house or other building, a park or other exterior public area, etc.).

Referring to FIGS. 1 and 2A to 2C, in this embodiment, the floral arrangement 10 comprises a plurality of modules $14_1 \ldots 14_N$ that are arranged to collectively form the image 12. The floral arrangement 10 can thus be said to be a "modular" floral arrangement. In this embodiment, each module $14_j$ ($1 \leq j \leq N$) comprises a plurality of grown plants $18_1 \ldots 18_P$, a sustaining medium 20, and a holding component 22.

Each of the grown plants $18_1 \ldots 18_P$ of each module $14_j$ may be a flower or other plant. Examples of flowers and/or other plants that may be used include agerantum plants, alyssum plants, lobelia plants, marigold plants, dusty miller plants, pansy plants, begonia plants, santolini plants, etc. It is to be understood that any suitable flowers and/or other plants may be used. Each module $14_j$ may comprise any number of plants. For example, in some embodiments, each module $14_j$ may comprise twenty (20) or more plants. In other embodiments, each module $14_j$ may comprise fifty (50) or more plants. In yet other embodiment, each module $14_j$ may comprise one hundred (100) or more plants. It is also to be understood that different numbers of grown plants and different types of grown plants may be used for each module $14_j$.

Each module $14_j$ renders a respective portion of the image 12 (e.g., a floral representation of all or part of one or more alphanumeric characters, one or more symbols, one or more patterns or shapes, and/or one or more real or imaginary objects). Thus, the grown plants $18_1 \ldots 18_P$ of each module $14_j$ form image elements that collectively make up the respective portion of the image 12 rendered by that module. That is, the grown plants $18_1 \ldots 18_P$ of each module $14_j$ have characteristics (e.g., color, size, etc.) and are disposed on that module such that they form the respective portion of the image 12 rendered by that module. An example of a system and a process for configuring the grown plants $18_1 \ldots 18_P$ of each module $14_j$ is presented later on.

The sustaining medium 20 of each module $14_j$ is a medium which has enabled development of the grown plants $18_1 \ldots 18_P$ of that module and which sustains these grown plants. The sustaining medium 20 of each module $14_j$ may comprise soil (i.e., natural or processed soil), any other mixture of mineral material and organic matter, or any other material or mixture of materials which enables development of plant life and which sustains plant life.

The holding component 22 of each module $14_j$ holds the sustaining medium 20 and the grown plants $18_1 \ldots 18_P$ of that module. In the embodiment shown in FIG. 2A, the holding component 22 of each module $14_j$ comprises a structural base 23 that supports the sustaining medium 20 and the grown plants $18_1 \ldots 18_P$ of that module. The structural base 23 may comprise a board, plate, or panel made of wood material (e.g., wood or plywood), metallic material, polymeric material, ceramic material, composite material, or a combination thereof. The board, plate, or panel may have perforations (not shown) that provide passageways between its underside and topside.

As shown in FIG. 2B, in some embodiments, the holding component 22 of each module $14_j$ may also comprise upstanding walls 25 that extend upwardly from edge portions of the structural base 23 of that holding component to provide lateral support to the sustaining medium 20 and the grown plants $18_1 \ldots 18_P$ of that module. Other upstanding walls (not shown) may also be provided between the upstanding walls 25 (e.g., parallel or transverse to the upstanding walls 25) to further enhance retention of the sustaining medium 20 and the grown plants $18_1 \ldots 18_P$. In this example, the upstanding walls 25 are implemented by L-shaped angle elements (e.g., extruded elements). The upstanding walls 25 can be made as small and discreet as possible to limit their visibility through the grown plants $18_1 \ldots 18_P$, thereby enabling the image 12 to appear as being uniform to an observer looking at the floral arrangement 10. Alternatively, the upstanding walls 25 can be removable from the holding component 22 such that they can be used during transportation and manipulation of the module $14_j$ and removed just prior to placement of that module in the floral arrangement 10.

As shown in FIG. 2C, in yet other embodiments, the holding component 22 of each module $14_j$ may also comprise a plurality of pots $27_1 \ldots 27_T$ disposed adjacent to one another on the structural base 23 of that holding component, where each pot $27_j$ ($1 \leq j \leq T$) holds a subset of the grown plants $18_1 \ldots 18_P$ of that module and a portion of the sustaining medium 20 of that module. This configuration may enable planting of seeds and/or seedlings individually in each pot $27_j$ so as to eventually obtain the subset of the grown plants $18_1 \ldots 18_P$ in that pot and subsequent positioning of the pots $27_1 \ldots 27_T$ on the structural base 23 so as to form the module $14_j$. The holding component 22 of each module $14_j$ may comprise any number of pots. For example, each module $14_j$ may comprise twenty-five (25) or more pots (e.g., sixty-four (64) pots arranged in a 8×8 configuration or 196 pots arranged in a 14×14 configuration).

In some cases, the structural base 23 of each module $14_j$ may comprise a carpet sponge layer (not shown) on its board, plate, or panel, with the pots $27_1 \ldots 27_T$ being placed on the carpet sponge layer. A physical assembly image (not shown) having a size which substantially corresponds to that of the respective portion of the image 12 rendered by the module $14_j$ and corresponding to a printed representation of that portion of the image 12 (e.g., a photography, drawing, or other diagram) may be provided on the board, plate, or panel or on the carpet sponge layer of the structural base 23 of that module. The physical assembly image, which may be a sheet or other thin element, may be used by one or more individuals to position the pots $27_1 \ldots 27_T$ over the physical assembly image so that they register with their corresponding positions in the physical assembly image.

In some embodiments, each pot $27_j$ may be biodegradable and, in cases where the structural base 23 is at least partly made of wood or other biodegradable material, each pot $27_j$ may be capable of biodegrading faster than the structural base 23. For example, each pot $27_j$ may be a peat pot, i.e., a pot made of compressed peat or other like material. Each module $14_j$ may be configured and dimensioned so as to facilitate its production, manipulation, transportation, and installation in the floral arrangement 10. For example, in one embodiment, each module $14_j$ may have a substantially square configuration with sides of approximately 1.0 m, and a maximum height which depends on its grown plants $18_1 \ldots 18_P$. Generally, each module $14_j$ may have any desired configuration (e.g., polygonal or not) with any desired dimensions (e.g., a dimension of 0.3 m or more). Also, in various embodiments, the modules $14_1 \ldots 14_N$ may have substantially identical configurations and dimensions or different ones of the modules $14_1 \ldots 14_N$ may have different configurations and dimensions.

The floral arrangement 10 is set up at its intended location by assembling the modules $14_1 \ldots 14_N$ so as to form the image 12. That is, the modules $14_1 \ldots 14_N$ are arranged such that the portions of the image 12 rendered by the modules $14_1 \ldots 14_N$ are visually combined to compose the image 12. A supporting structure may be provided to support the modules $14_1 \ldots 14_N$. In the embodiment shown in FIGS. 1 and 2, the supporting structure comprises a mound 29 that is built adjacent to the road. The mound 29 may be made of earth, stone, and/or any other suitable material. The mound 29 is provided with a face dimensioned to receive the floral arrangement 10. In this example, the face is slanted to enable the floral arrangement 10 to be inclined relative to the road's surface. A sunken area 31 is dug in the mound 29 and is shaped according to an outer boundary of the floral arrangement 10 once the modules $14_1 \ldots 14_N$ are assembled. The sunken area 31 facilitates assembly of the floral arrangement 10 and physically locates and retains the modules $14_1 \ldots 14_N$ on the mound 29. Provision of further retention mechanisms to prevent the modules $14_1 \ldots 14_N$ from being accidentally displaced from the face of the mound 29 may thus be unnecessary.

In other embodiments, such as when it is not practical or desired to build a mound, other types of supporting structures may be used at the intended location of the floral arrangement 10 to support the modules $14_1 \ldots 14_N$. For example, a truss structure enabling the modules $14_1 \ldots 14_N$ to be supported in an inclined position can be used. The truss structure may be built from wood material, metallic material, polymeric material, or any other suitable material. Such a truss structure may be particularly useful when the indented location of the floral arrangement 10 cannot be easily accessed by heavy earth working equipment that might be necessary to erect a mound.

While in the embodiment shown in FIGS. 1 and 2 the floral arrangement 10 comprises a certain number of modules, it is to be understood that, in other embodiments, the floral arrangement 10 may comprise any number of modules.

Also, in certain embodiments, the floral arrangement 10 may comprise one or more non-floral visible elements (not shown) that complement the image 12. Each non-floral visible element may be stone, pebble, or other types of rock; a plastic, metallic, ceramic and/or composite element; or any other visible element lacking plant life. Each non-floral visible element may be part of one or more of the modules $14_1 \ldots 14_N$ or may not be part of any of the modules $14_1 \ldots 14_N$. For example, such one or more non-floral visible elements may be used to create a visible border for the image 12 and/or to create image features that cannot be satisfactorily created using grown plants.

Furthermore, in some embodiments, the floral arrangement 10 may be provided with an irrigation system (not shown) to supply water from a source to the grown plants $18_1 \ldots 18_P$ of each module $14_j$. For example, the irrigation system may comprise a plurality of irrigation units, where each irrigation unit is part of a respective one of the modules $14_1 \ldots 14_N$. The irrigation unit of each module $14_j$ may comprise one or more conduits adapted to convey water to irrigate that module.

Figure 4:
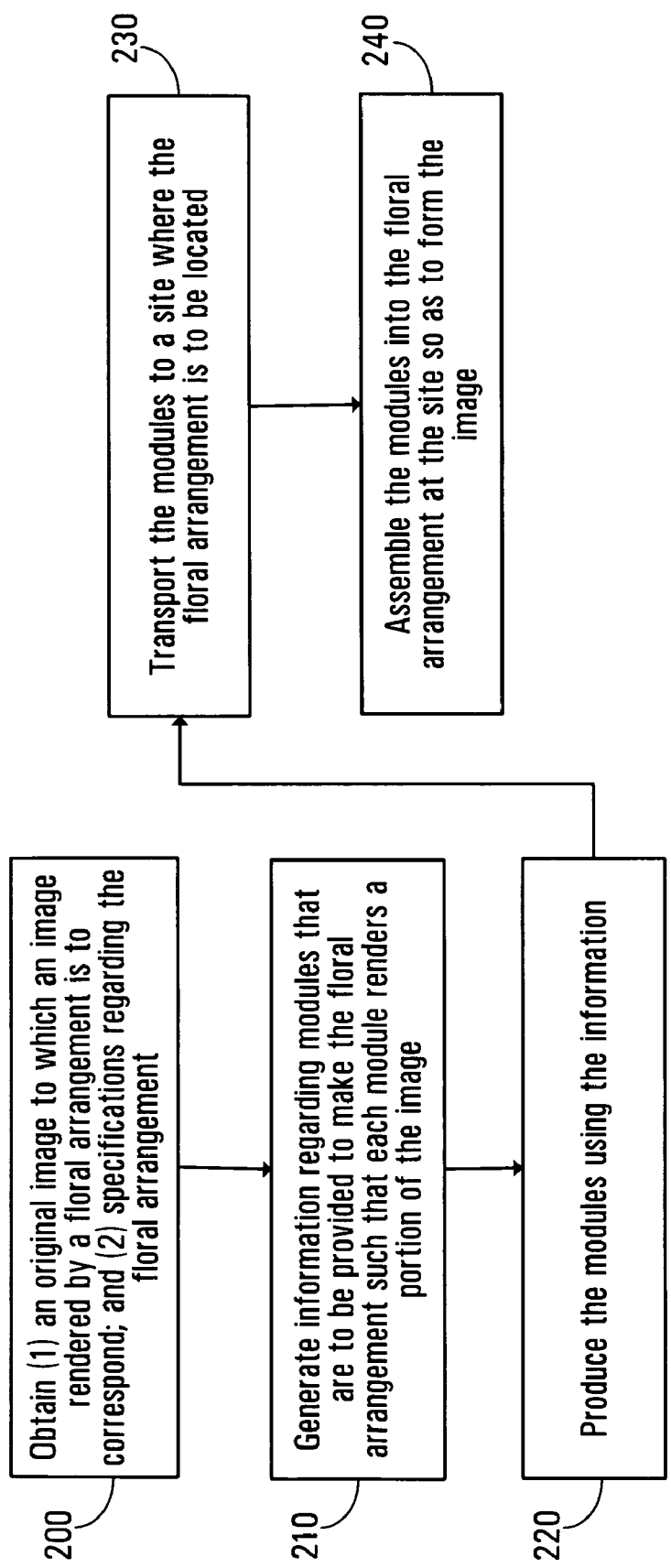
FIG. 4 diagrammatically shows a process for creating a floral arrangement, in accordance with an embodiment of the present invention.
Figure 5:
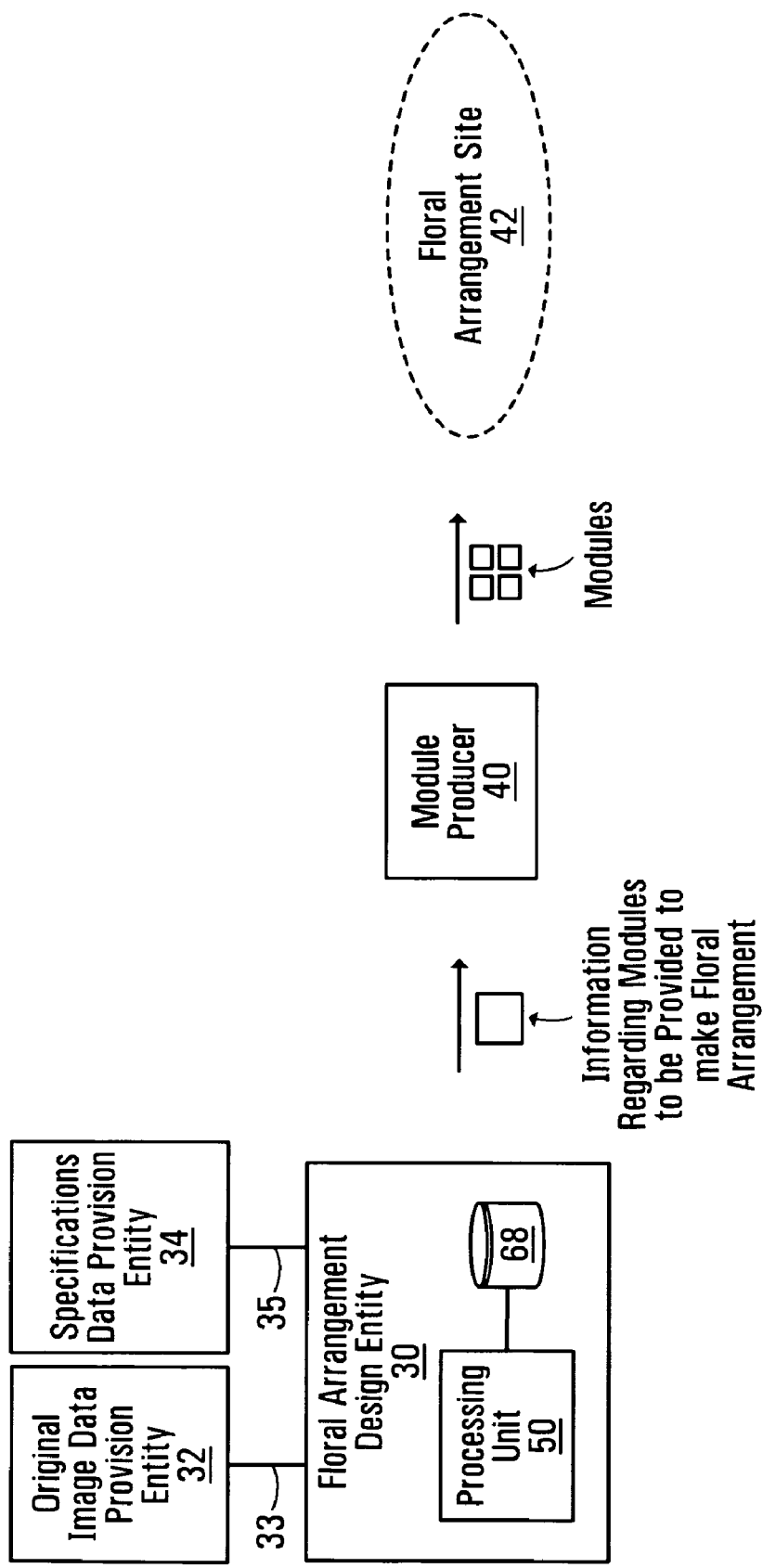
FIG. 5 diagrammatically shows a system for creating a floral arrangement, in accordance with an embodiment of the present invention.

Turning now to FIGS. 4 and 5, there is illustrated an embodiment of a process and a system for creating the floral arrangement 10. As described below, in this embodiment, a floral arrangement design entity 30 is operative to interact with an original image data provision entity 32 and a specification data provision entity 34 to enable a module producer 40 to produce the modules $14_1 \ldots 14_N$ that can be subsequently transported to a site 42 (in this example, the location adjacent to the road) where they can be assembled into the floral arrangement 10.

Step 200

In this embodiment, an original image is obtained and it is desired that the image 12 rendered by the floral arrangement 10 correspond to the original image. The original image may be a physical image, such as all or part of a physical picture (e.g., a photography, a drawing, a painting, etc.) or other paper image. Alternatively, the original image may be a digital image, such as all or part of a computer image file (e.g., a bitmap image file, a jpeg image file, etc.) or a digital picture. For example, in the embodiment shown in FIG. 1, the image 12 can be viewed as corresponding to the original image shown in FIG. 6A, which can be a physical image or a digital image.

The original image data provision entity 32 is operative to generate data regarding the original image (hereinafter referred to as "original image data") and to cause provision of that original image data to the floral arrangement design entity 30. The original image data provision entity 32 may comprise one or more digital imaging devices and/or one or more computer applications (e.g., image editing and/or creation applications) that can be used to generate the original image data. For example, a scanner may be used to scan a picture or other physical image or a digital camera may be used to obtain a digital image, so as to enable generation of the original image data. In another example, a user may use a computer image creation application (e.g., Adobe Photoshop®) to create the original image, and thus enable generation of the original image data. In yet another example, a user may use both a digital imaging device and a computer image editing application to obtain the original image, and thus enable generation of the original image data. Generally, the original image data provision entity 32 may be implemented using software, firmware, and/or hardware.

Furthermore, in this embodiment, specifications regarding the floral arrangement 10 are obtained. These specifications may specify: desired dimensions of the floral arrangement 10; an intended location of the floral arrangement 10; a desired duration of the floral arrangement 10 (e.g., between maintenance activities or before repair or replacement); climatic conditions (e.g., temperature, wind, precipitation, etc.) associated with the intended location of the floral arrangement 10; restrictions on types of plants that may be used for the floral arrangement 10; and/or any other information that may need to be specified to design the floral arrangement 10.

The specifications data provision entity 34 is operative to generate data indicative of the specifications regarding the floral arrangement 10 (hereinafter referred to as "specifications data") and to cause provision of that specifications data to the floral arrangement design entity 30. The specifications data provision entity 34 may be implemented as part of a computer system that allows a user to use an input device (e.g., a keyboard, a mouse, a touchscreen, a microphone, etc.) to enter the specifications regarding the floral arrangement 10, so as to enable generation of the specifications data. Generally, the specifications data provision entity 34 may be implemented using software, firmware, and/or hardware.

In this embodiment, the floral arrangement design entity 30 comprises a first input to receive the original image data, a second input to receive the specifications data, and a processing unit 50 to process the original image data and the specifications data. The floral arrangement design entity 30 may be implemented as part of a computer system. Generally, the floral arrangement design entity 30 may be implemented using software, firmware, and/or hardware. Functionality and operation of the floral arrangement design entity 30 is further discussed later on.

The floral arrangement design entity 30 is communicatively coupled to the original image data provision entity 32 and the specifications data provision entity 34 via respective communication links 33 and 35.

In one embodiment, the floral arrangement design entity 30, the original image data provision entity 32, and the specifications data provision entity 34 may be part of a single computer system located at a certain location, in which case each of the communication links 33 and 35 may be a cable and/or a logical link. For example, the single computer system may be operated by a floral arrangement provider and located at a facility associated with that floral arrangement provider.

In another embodiment, the original image data provision entity 32, the specifications data provision entity 34, and/or the floral arrangement design entity 30 may be part of two or more computer systems located remotely from each other, in which case each of the communication links 33 and 35 may comprise a portion of a communications network. The communications network may comprise a portion of a data network (e.g., the Internet, a wide area network (WAN), a local area network (LAN)), a public telephony network (e.g., the Public Switched Telephone Network (PSTN)), and/or a wireless network (e.g., a cellular network). For example, the original image data provision entity 32 and the specifications data provision entity 34 may be part of a first computer system that is associated with a certain party desirous of setting up a floral arrangement (e.g., an individual, a company, a government authority, etc.) and that is located in a building associated with that certain party. The floral arrangement design entity 30 may be part of a second computer system that is operated by a floral arrangement provider and located at a facility associated with that floral arrangement provider, the first computer system and the second computer system being coupled to one another via a communications network.

It will be appreciated that, in some embodiments, certain portions of the floral arrangement design entity 30, the original image data provision entity 32, and/or the specifications data provision entity 34 may be implemented as pre-programmed hardware or firmware elements (e.g., application specific integrated circuits (ASICs), electrically erasable programmable read-only memories (EEPROMs), etc.), or other related components. In other embodiments, certain portions of the floral arrangement design entity 30, the original image data provision entity 32, and/or the specifications data provision entity 34 may be implemented as a processor having access to a code memory which stores program instructions for operation of the processor. The program instructions may be stored on a medium which is fixed, tangible, and readable directly by these certain portions (e.g., removable diskette, compact disk read-only memory (CD-ROM), read-only memory (ROM), fixed disk, etc.). Alternatively, the program instructions may be stored remotely but transmittable to these certain portions via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared, or other transmission schemes).

Step 210

In this embodiment, the processing unit 50 of the floral arrangement design entity 30 processes the original image data and the specifications data so as to generate information regarding the modules $14_1 \ldots 14_N$ that are to be provided to make the floral arrangement 10.

The information regarding the modules $14_1 \ldots 14_N$ comprises information regarding the grown plants $18_1 \ldots 18_P$ to be included in each module $14_j$ (e.g., a type, color, and/or size of each of these grown plants) and information regarding a configuration (i.e., a relative arrangement) of the grown plants $18_1 \ldots 18_P$ in each module $14_j$ such that each module $14_j$ renders a respective portion of the image 12. It is to be understood that various other types of information regarding the grown plants $18_1 \ldots 18_P$ to use for each module $14_j$ may be generated.

In cases where the specifications data is indicative of the intended location of the floral arrangement 10 and/or climatic conditions associated with that intended location, the information regarding the grown plants $18_1 \ldots 18_P$ to use for each module $14_j$ may specify one or more particular types of plants that are suitable for use at the intended location of the floral arrangement 10 and/or in those climatic conditions.

The information regarding the modules $14_1 \ldots 14_N$ may also comprise: information regarding the sustaining medium 20 of each module $14_j$ (e.g., a type of soil, a quantity, etc.); information regarding the holding component 22 of each module $14_j$ (e.g., dimensions, constituent material(s), etc.); information regarding overall dimensions of the modules $14_1 \ldots 14_N$; information regarding price of the modules $14_1 \ldots 14_N$, etc.

In order to generate the information regarding the modules $14_1 \ldots 14_N$, in this embodiment, the processing unit 50 performs an image compensation process whereby the original image is effectively "stretched" in one dimension to obtain a processed image, which in this case is a stretched version of the original image. It is recalled that, in this example, in order to be structurally stable and enable or facilitate viewing of the image 12 by individuals moving along the road (at the site 42), the floral arrangement 10, once set up, is inclined relative to the road's surface. An individual looking at the floral arrangement 10 from the road therefore does not see the image 12 in plan view, i.e., the individual's line of sight is not perpendicular to the image 12. Rather, the image 12 is at an angle relative to the individual's line of sight. This oblique viewing perspective results in an apparent change in dimension of the floral arrangement 10 that leads to the individual viewing a distorted version of the image 12. The image compensation process is performed to effect a controlled visual distortion of the original image such that the distorted version of the image 12 that is viewed by the individual corresponds the original image.

Specifically, as shown in FIG. 3, it is thus desirable to design the floral arrangement 10 such that the image 12 is a stretched version of a projected image 13 that is viewable by an individual looking at the floral arrangement 10 along an expected line of sight LS. As mentioned previously, an "expected line of sight" is an imaginary straight line along which an individual is expected to look at the floral arrangement 10 when the floral arrangement 10 is set up at its intended location (in this case, when the floral arrangement 10 is set up in its inclined position adjacent to the road). The projected image 13 corresponds to a projection of the image 12 in a plane normal to the expected line of sight LS.

Figure 6A:
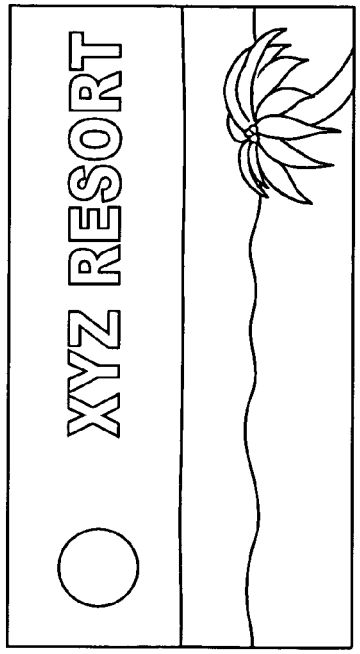
FIGS. 6A to 6C respectively illustrate an example of an original image to which corresponds the image rendered by the floral arrangement shown in FIG. 1, an example of a stretched version of the original image, and an example of an imaginary grid conceptually applied to the stretched version of the original image.
Figure 6B:
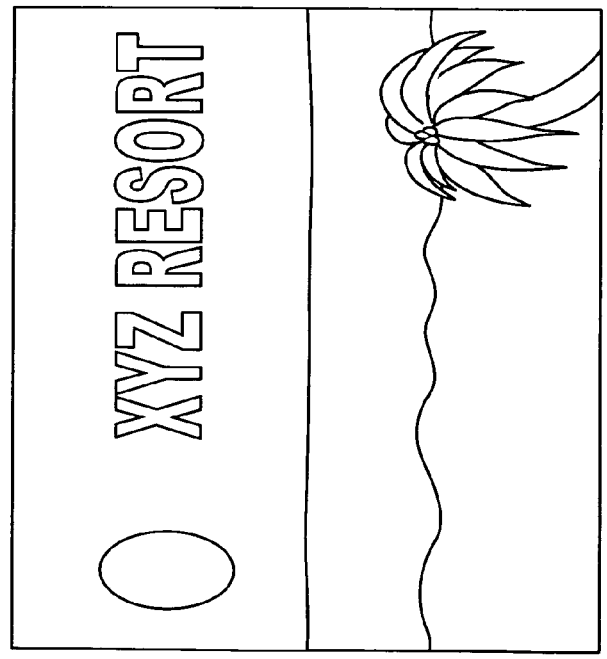

As part of the image compensation process, the processing unit 50 processes the original image data to generate data regarding a stretched version of the original image (also referred to as "stretched original image data"). For instance, FIGS. 6A and 6B show the original image that may have been used in this example as well as the stretched version of the original image that may result from the image compensation process. It can be seen that the image compensation process effectively extends the original image in one dimension so as to obtain the stretched version of the original image. The image compensation process may effect a degree of stretching that is a function of a desired inclination angle θ of the floral arrangement 10 once set up at the site 42 and/or any other desired parameter.

Thus, in this embodiment, the image compensation process is performed in order to design the floral arrangement 10 such that the image 12 corresponds to the stretched version of the original image, thereby resulting in the projected image 13 being viewable as corresponding to the original image. In other embodiments, it may not be desired or required to produce a stretched version of the original image in which case the processing unit 50 may not perform any image compensation process. It is therefore to be understood that the image 12 can correspond to a particular original image by corresponding to the particular original image itself or by corresponding to a modified version of the particular original image (such as a stretched version of the particular original image).

Figure 6C:
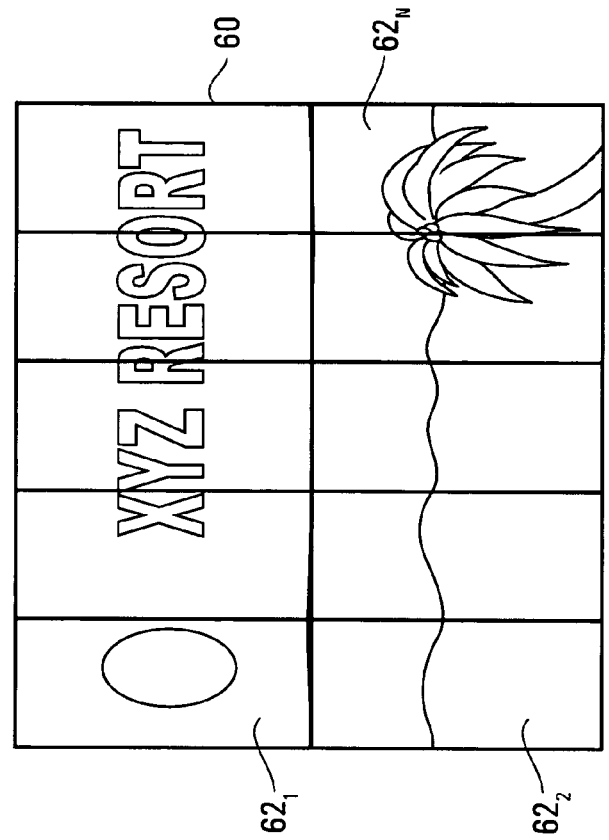

As shown in FIG. 6C, in this embodiment, the processing unit 50 can be viewed as conceptually applying an imaginary grid 60 on the stretched version of the original image. The imaginary grid 60 forms a plurality of grid elements $62_1 \ldots 62_N$, where each grid element $62_j$ ($1 \leq j \leq N$) delimits a respective portion of the stretched version of the original image. For each grid element $62_j$, the processing unit 50 processes a portion of the stretched original image data that is representative of the respective portion of the stretched version of the original image delimited by that grid element in order to generate the information regarding the module $14_j$ that is intended to render that respective portion of the stretched version of the original image. In embodiments where no image compensation process is performed, the processing unit 50 may apply the imaginary grid 60 on the original image such that each grid element $62_j$ delimits a respective portion of the original image and may process respective portions of the original image data to generate the information regarding the modules $14_1 \ldots 14_N$.

In this embodiment, the processing unit 50 consults a database 68 that stores data regarding plants capable of being used to produce modules such as the modules $14_1 \ldots 14_N$. For example, the data stored in the database 68 may comprise data regarding one or more colors, one or more sizes, one or more climatic conditions for viability (e.g., temperature, wind, precipitation, etc.), and/or one or more geographic zones suitable for location of each of a plurality of types of flowers and/or other plants. It is to be understood that the database 68 may store various other data regarding plants capable of being used to produce modules.

Upon completion of step 210, the floral arrangement design entity 30 has generated the information regarding the modules $14_1 \ldots 14_N$ that are to be provided to make the floral arrangement 10.

Step 220

The information regarding the modules $14_1 \ldots 14_N$ that has been generated by the floral arrangement design entity 30 is used to produce the modules $14_1 \ldots 14_N$ that are to be provided to make the floral arrangement 10.

To that end, the floral arrangement design entity 30 causes communication of the information regarding the modules $14_1 \ldots 14_N$ to the module producer 40. The module producer 40 may be proximate to the floral arrangement design entity 30. For example, the module producer 40 may be a unit, department, group or other part of a floral arrangement provider that operates the floral arrangement design entity 30, in which case the module producer 40 and the floral arrangement design entity 30 may be located at a common site associated with the floral arrangement provider. Alternatively, the module producer 40 may be remote from the floral arrangement design entity 30. For example, the module producer 40 and the floral arrangement design entity 30 may be located at geographically remote sites (e.g., in different cities or countries).

In one embodiment, the floral arrangement design entity 30 may cause printing of one or more documents containing the information regarding the modules $14_1 \ldots 14_N$, the one or more documents being subsequently provided to the module producer 40. In another embodiment, the floral arrangement design entity 30 may cause the information regarding the modules $14_1 \ldots 14_N$ to be displayed on an electronic display associated with the module producer 40. In yet another embodiment, the floral arrangement design entity 30 may cause the information regarding the modules $14_1 \ldots 14_N$ to be communicated to the module producer 40 via a communications network. For example, the floral arrangement design entity 30 may cause transmission of an electronic mail message to an intended recipient associated with the module producer 40, the electronic mail message conveying the information regarding the modules $14_1 \ldots 14_N$. As another example, the floral arrangement design entity 30 may cause the information regarding the modules $14_1 \ldots 14_N$ to be accessible via a computer system associated with the module producer 40. For instance, the floral arrangement design entity 30 may cause the information regarding the modules $14_1 \ldots 14_N$ to be available through a data network site (e.g., a web site) that is accessible via the computer system associated with the module producer 40.

Based on the information regarding the modules $14_1 \ldots 14_N$, the module producer 40 proceeds to produce the modules $14_1 \ldots 14_N$ that are to be provided to make the floral arrangement 10.

In some embodiments, one or more individuals associated with the module producer 40 use the information regarding the modules $14_1 \ldots 14_N$ to produce the modules $14_1 \ldots 14_N$. The one or more individuals may construct the holding component 22 of each module $14_j$ using appropriate materials and elements. Alternatively, the holding component 22 of each module $14_j$ may be obtained from pre-constructed holding components available to the module producer 40. The sustaining medium 20 of each module $14_j$ is obtained from a supply of sustaining medium or sustaining medium ingredients and is provided on the holding component 22 of that module. Based on the information regarding the grown plants $18_1 \ldots 18_P$ of each module $14_j$, particular seed elements (i.e., seeds and/or seedlings) are retrieved from a supply of seed elements for each module $14_j$ and are positioned in the sustaining medium 20 of that module in a particular configuration so as to develop into the grown plants $18_1 \ldots 18_P$ of that module. In cases where the holding component 22 of each module $14_j$ comprises the pots $27_1 \ldots 27_T$, a portion of the sustaining medium 20 of that module is placed in each pot $27_j$ and particular seed elements are positioned in that portion of the sustaining medium 20 so as to develop into the subset of the grown plants $18_1 \ldots 18_P$ in that pot. The pots $27_1 \ldots 27_T$ may then be positioned on the structural base 23 of the holding component 22 so as to form the module $14_j$.

In other embodiments, some or all of the aforementioned actions performed by the one or more individuals may be partly or entirely performed by machines associated with the module producer 40 that use the information regarding the modules $14_1 \ldots 14_N$ to produce the modules $14_1 \ldots 14_N$.

Step 230

When ready, the modules $14_1 \ldots 14_N$ are transported to the site 42 where they can be assembled into the floral arrangement 10.

In one embodiment, the module producer 40 may be responsible for transporting the modules $14_1 \ldots 14_N$ to the site 42. The modules $14_1 \ldots 14_N$ may be loaded into a transportation vehicle (e.g., a truck, a rail car, an airplane, etc.) and transported to the site 42. The transportation vehicle may comprise a cargo area adapted to store the modules $14_1 \ldots 14_N$ during their transportation. For example, the cargo area may be provided with one or more racks configured to enable the modules $14_1 \ldots 14_N$ to be placed therein such that, for each rack, individual ones of the modules $14_1 \ldots 14_N$ are placed on different levels (e.g., shelves) of that rack without physically contacting each other.

In other embodiments, another party (e.g., a party owning, responsible for, or otherwise associated with the site 42) may be responsible for transporting the modules $14_1 \ldots 14_N$ to the site 42. In such embodiments, the module producer 40 may enable that party to pick up the modules $14_1 \ldots 14_N$ at a pick-up point (e.g., a warehouse or other facility) associated with the module producer 40 for transportation to the site 42.

Step 240

Once they arrive at the site 42, the modules $14_1 \ldots 14_N$ can be assembled into the floral arrangement 10. Specifically, the floral arrangement 10 is set up by assembling the modules $14_1 \ldots 14_N$ so as to form the image 12. To that end, one or more individuals may position the modules $14_1 \ldots 14_N$ adjacent to each other on the supporting structure (in this example, the mound 29 with the sunken area 31) at the site 42 so as to form the image 12.

Assembly instructions may be provided to the one or more individuals to facilitate correct assembly of the modules $14_1 \ldots 14_N$ into the floral arrangement 10. Generally, the assembly instructions may comprise any means for conveying assembly information to facilitate assembly of the modules $14_1 \ldots 14_N$ into the floral arrangement 10.

Figure 7:
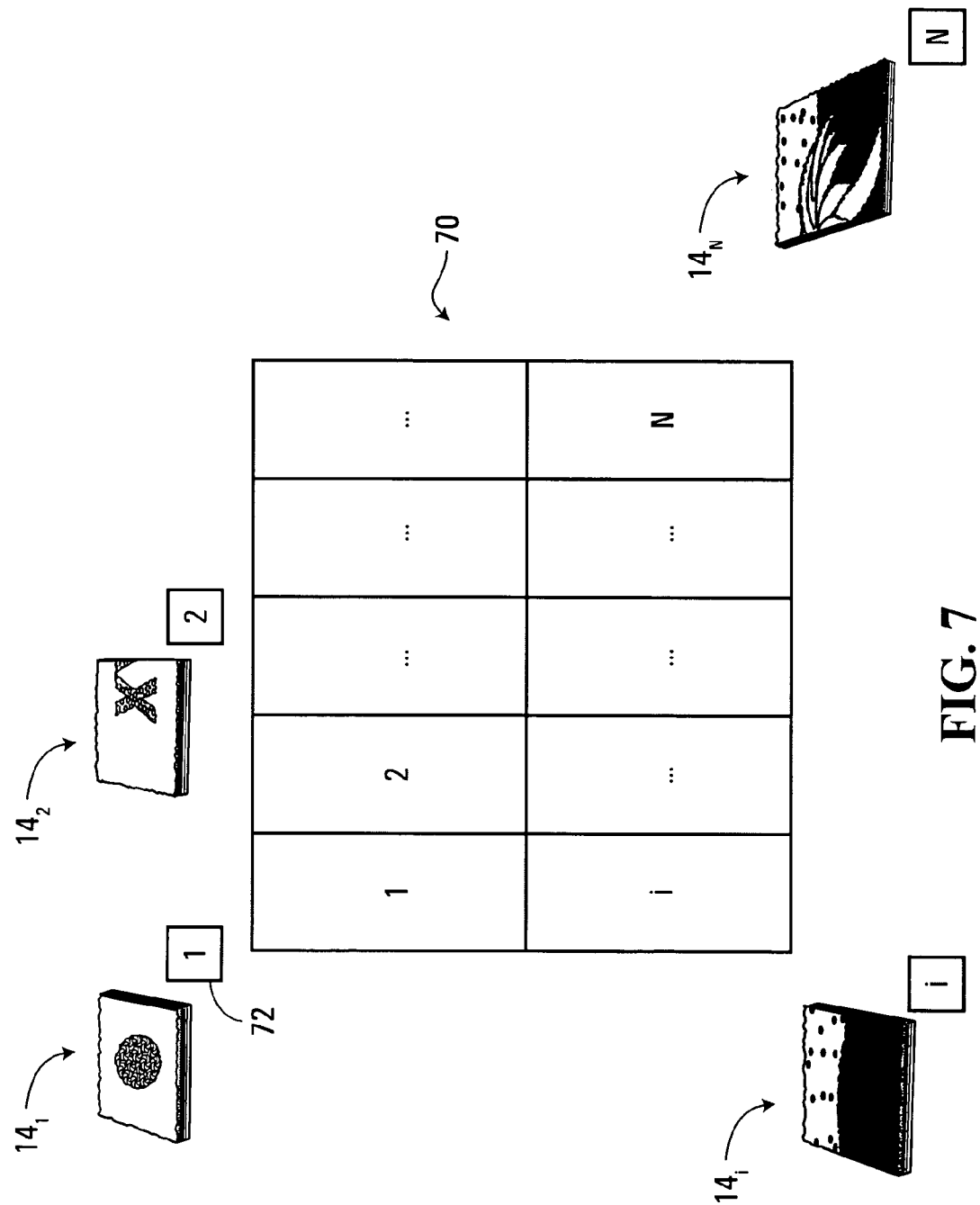
FIG. 7 diagrammatically shows an embodiment of an assembly guide to facilitate correct assembly of the modules into the floral arrangement shown in FIG. 1.

In one embodiment, as shown in FIG. 7, the assembly instructions may comprise a respective identifier 72 associated with each module $14_j$ and a diagram 70 that contains information enabling positioning of each of the modules $14_1 \ldots 14_N$ in the floral arrangement 10 based on its respective identifier 72. The respective identifier 72 of each module $14_j$ may comprise one or more alphanumeric characters, color codes, or other identification elements and may be printed on, coupled to, or otherwise associated with that module. The diagram 70 may be provided electronically or as part of a printed document.

Figure 8:
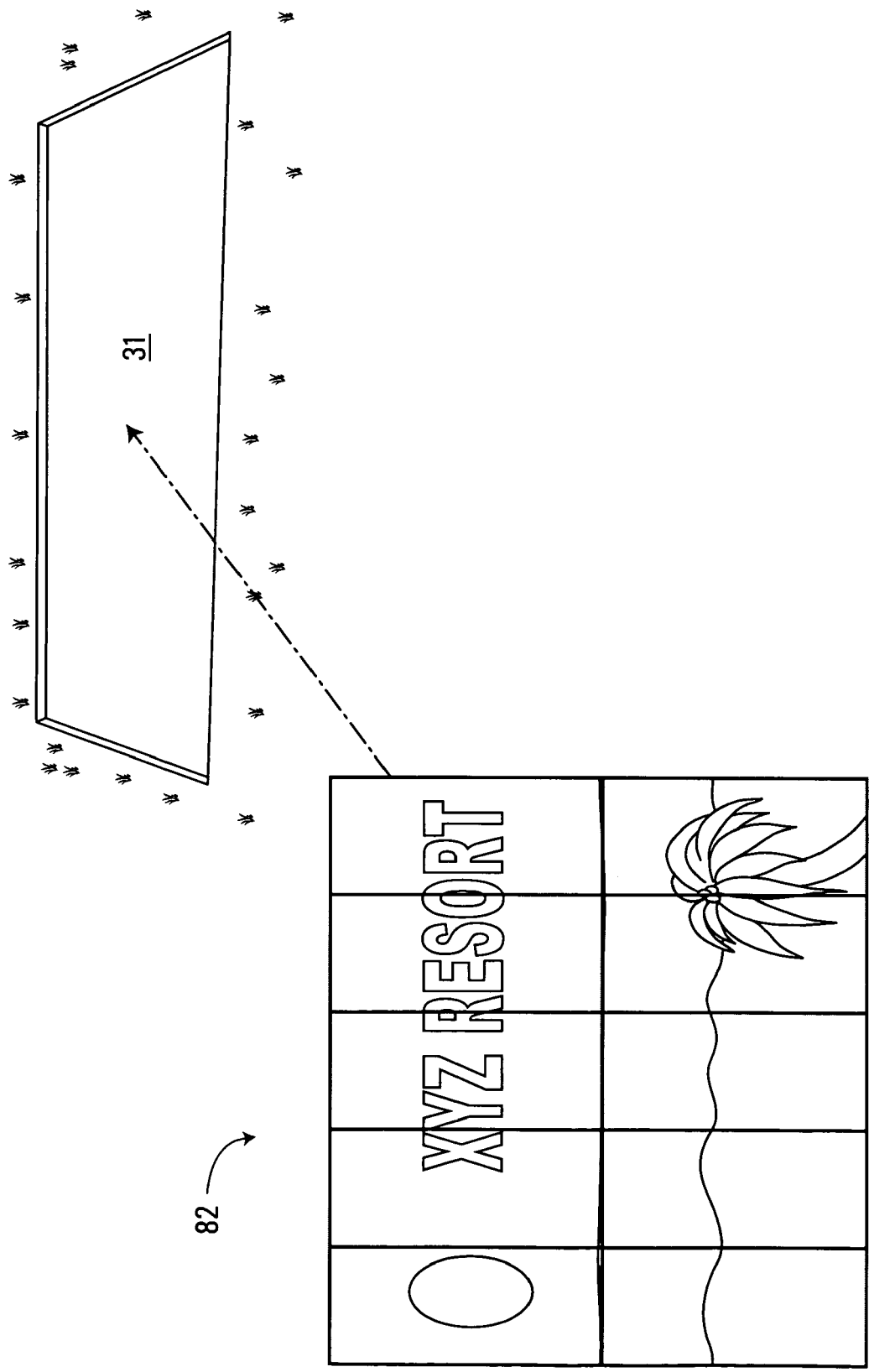
FIG. 8 diagrammatically shows another embodiment of an assembly guide to facilitate correct assembly of the modules into the floral arrangement shown in FIG. 1.

In another embodiment, as shown in FIG. 8, the assembly instructions may comprise a physical assembly image 82 that has a size substantially corresponding to that of the image 12 and that corresponds to a printed representation of the image 12 (e.g., a photography, drawing, or other diagram). The physical assembly image 82, which may be a sheet or other thin element, may be placed on the supporting structure at the site 42 and the one or more individuals may proceed to position the modules $14_1 \ldots 14_N$ over the physical assembly image 82 so that they register with their corresponding positions in the physical assembly image 82. The physical assembly image 82 may be removed from under the modules $14_1 \ldots 14_N$ when they are put in place (e.g., by progressively pulling the physical assembly image 82 from under each row of the modules $14_1 \ldots 14_N$ that has been placed). Alternatively, the physical assembly image 82 may be left under the modules $14_1 \ldots 14_N$ when they are put in place. In some cases, the physical assembly image 82 may be made of biodegradable material so as to biodegrade over time.

It will thus be appreciated that the floral arrangement 10 can be efficiently and conveniently created. In some cases, design and set up of the floral arrangement 10 can be effected in a couple of weeks. This can be particularly beneficial in situations where it is desired or necessary to rapidly set up the floral arrangement 10 or replace it with a new floral arrangement (e.g., in situations where the floral arrangement 10 is used in an advertisement application). Furthermore, the floral arrangement design entity 30 enables design of the floral arrangement 10 such that the image 12 florally corresponds to any desired original image, which, in some instances, may have a relatively high degree of complexity. This enables the floral arrangement 10 to be used in certain applications, including advertisement applications, notification applications, and decoration applications, for which other floral arrangements may be inept or inadequate. Moreover, provision of the modules $14_1 \ldots 14_N$ enable the floral arrangement 10 to be set up by one or more individuals without requiring such individuals to have specific skills or experience and with practically no potential for error.

It will also be appreciated that placement of the floral arrangement 10 at the site 42 may enable a first party owning, responsible for, or otherwise associated with the site 42 (e.g., a government, a corporation, an individual, etc.) to obtain a compensation from a second party desiring to effect such placement (e.g., a floral arrangement provider, an advertiser, etc.). For example, this may apply in embodiments such as that shown in FIG. 1 where the floral arrangement 10 is used in an advertisement application.

The compensation may be a monetary compensation such as a single payment (e.g., in situations where the first party sells a space at the site 42 for placement of the floral arrangement 10), a recurring payment (e.g., in situations where the party leases a space at the site 42 for placement of the floral arrangement 10), a combination thereof, or any other type of compensation that involves exchange between the first party and the second party of money, financial instruments (e.g., securities, bonds, etc.), or any other item(s) having a monetary value.

Alternatively, the compensation may be a non-monetary compensation, i.e., a compensation that does not involve exchange between the first party and the second party of money, financial instruments, or any other item(s) having a monetary value. For example, the non-monetary compensation can be a commitment of the second party to cause performance of an action on the floral arrangement 10 and/or an area adjacent to the floral arrangement 10. The action may comprise cleaning or repairing the floral arrangement 10, replacing the floral arrangement 10 with a new floral arrangement, and/or groundskeeping or landscaping the area adjacent to the floral arrangement 10. One or more conditions regarding the action may be specified such as, for example, a number of times the action is to be performed, one or more moments (e.g., dates) at which the action is to be performed, a frequency at which the action is to be performed, etc.

As a further alternative, the compensation may comprise both a monetary compensation and a non-monetary compensation.

Although various embodiments have been illustrated, this was for the purpose of describing, but not limiting, the invention. Various modifications will become apparent to those skilled in the art and are within the scope of the present invention, which is defined by the attached claims.

What is claimed is:

1. A modular floral arrangement rendering an image, said modular floral arrangement comprising a plurality of modules, each module rendering a portion of the image and comprising:
   a plurality of grown plants forming image elements that collectively make up the portion of the image rendered by said module;
   a sustaining medium for said grown plants; and
   a holding component holding said sustaining medium and said grown plants, said holding component maintaining said grown plants together as a unit before placement of said module in said modular floral arrangement and assembly of said modules to render the image;
said modules being arranged such that the portions of the image rendered by said modules are visually combined to compose the image.

2. A modular floral arrangement as claimed in claim 1, wherein the image conveys an advertisement.

3. A modular floral arrangement as claimed in claim 2, wherein the advertisement advertises at least one of an organization, a product, an event, and a site.

4. A modular floral arrangement as claimed in claim 1, wherein said modular floral arrangement is located adjacent to a separate sign element such that the image is visually associated with the separate sign element, the separate sign element conveying information about a party desirous of displaying the image.

5. A modular floral arrangement as claimed in claim 4, wherein the image and the separate sign element together advertise at least one of an organization, a product, an event, and a site.

6. A modular floral arrangement as claimed in claim 1, wherein said modular floral arrangement is located adjacent to a pathway.

7. A modular floral arrangement as claimed in claim 6, wherein the pathway is a road.

8. A modular floral arrangement as claimed in claim 1, wherein said modular floral arrangement is located at an airport area.

9. A modular floral arrangement as claimed in claim 1, wherein said modular floral arrangement is located at an area so as to be visible to individuals in a flying aircraft.

10. A modular floral arrangement as claimed in claim 1, wherein said modular floral arrangement is placed on a slanted face of a supporting structure.

11. A modular floral arrangement as claimed in claim 10, wherein the supporting structure is a mound.

12. A modular floral arrangement as claimed in claim 10, wherein the supporting structure is a truss structure.

13. A modular floral arrangement as claimed in claim 10, wherein the supporting structure comprises a recessed area receiving said modular floral arrangement.

14. A modular floral arrangement as claimed in claim 10, wherein the image is a desired image to be viewed by an observer along a generally horizontal line of sight, the grown plants of said modules being disposed with respect to one another to create a stretched version of the desired image when said modular floral arrangement is viewed along a direction that is generally perpendicular to said modular floral arrangement.

15. A modular floral arrangement as claimed in claim 1, wherein said sustaining medium of each module comprises a mixture of mineral material and organic matter.

16. A modular floral arrangement as claimed in claim 1, wherein said sustaining medium of each module comprises soil.

17. A modular floral arrangement as claimed in claim 1, wherein said holding component of each module comprises a structural base.

18. A modular floral arrangement as claimed in claim 17, wherein said structural base of each module comprises at least one of a board, a plate, and a panel.

19. A modular floral arrangement as claimed in claim 1, wherein said holding element of each module is at least partly made of at least one of wood material, metallic material, polymeric material, ceramic material, and composite material.

20. A modular floral arrangement as claimed in claim 17, wherein said holding component of each of at least one of said modules comprises walls extending upwardly from said structural base of said module.

21. A modular floral arrangement as claimed in claim 17, wherein said holding component of each of at least one of said modules comprises a plurality of pots disposed adjacent to one another on said structural base of said module, each pot holding a subset of said grown plants of said module and a portion of said sustaining medium of said module.

22. A modular floral arrangement as claimed in claim 21, wherein said pots of each of said at least one of said modules are biodegradable.

23. A modular floral arrangement as claimed in claim 21, wherein said pots of each of said at least one of said modules are peat pots.

24. A modular floral arrangement as claimed in claim 21, wherein said pots of each of said at least one of said modules are capable of biodegrading faster than said structural base of said module.

25. A modular floral arrangement as claimed in claim 1, wherein said plurality of grown plants of each module comprises at least 20 plants.

26. A modular floral arrangement as claimed in claim 1, wherein each module has a dimension of at least 0.3 meters.

27. A combination comprising a plurality of modules for assembly into a modular floral arrangement rendering an image, each module rendering a portion of the image and comprising:
a plurality of grown plants forming image elements that collectively make up the portion of the image rendered by said module;
a sustaining medium for said grown plants; and
a holding component holding said sustaining medium and said grown plants, said holding component maintaining said grown plants together as a unit before placement of said module in said modular floral arrangement and assembly of said modules to render the image;
said modules being capable of being arranged such that the portions of the image rendered by said modules are visually combined to compose the image.

28. A combination as claimed in claim 27, wherein the image conveys an advertisement.

29. A combination as claimed in claim 28, wherein the advertisement advertises at least one of an organization, a product, an event, and a site.

30. A combination as claimed in claim 27, wherein said modular floral arrangement is located adjacent to a separate sign element such that the image is visually associated with the separate sign element, the separate sign element conveying information about a party desirous of displaying the image.

31. A combination as claimed in claim 30, wherein the image and the separate sign element together advertise at least one of an organization, a product, an event, and a site.

32. A combination as claimed in claim 27, wherein the modular floral arrangement is for location adjacent to a pathway.

33. A combination as claimed in claim 32, wherein the pathway is a road.

34. A combination as claimed in claim 27, wherein the modular floral arrangement is for location at an airport area.

35. A combination as claimed in claim 27, wherein the modular floral arrangement is for location at an area so as to be visible to individuals in a flying aircraft.

36. A combination as claimed in claim 27, wherein the modular floral arrangement is for placement on a slanted face of a supporting structure.

37. A combination as claimed in claim 36, wherein the supporting structure is a mound.

38. A combination as claimed in claim 36, wherein the supporting structure is a truss structure.

39. A combination as claimed in claim 36, wherein the supporting structure comprises a recessed area for receiving the modular floral arrangement.

40. A combination as claimed in claim 36, wherein the image is a desired image to be viewed by an observer along a generally horizontal line of sight, the grown plants of said modules being disposed with respect to one another to create a stretched version of the desired image when the modular floral arrangement is viewed along a direction that is generally perpendicular to the modular floral arrangement.

41. A combination as claimed in claim 27, wherein said sustaining medium of each module comprises a mixture of mineral material and organic matter.

42. A combination as claimed in claim 27, wherein said sustaining medium of each module comprises soil.

43. A combination as claimed in claim 27, wherein said holding component of each module comprises a structural base.

44. A combination as claimed in claim 43, wherein said structural base of each module comprises at least one of a board, a plate, and a panel.

45. A combination as claimed in claim 27, wherein said holding element of each module is at least partly made of at least one of wood material, metallic material, polymeric material, ceramic material, and composite material.

46. A combination as claimed in claim 43, wherein said holding component of each of at least one of said modules comprises walls extending upwardly from said structural base of said module.

47. A combination as claimed in claim 43, wherein said holding component of each of at least one of said modules comprises a plurality of pots disposed adjacent to one another on said structural base of said module, each pot holding a subset of said grown plants of said module and a portion of said sustaining medium of said module.

48. A combination as claimed in claim 47, wherein said pots of each of said at least one of said modules are biodegradable.

49. A combination as claimed in claim 47, wherein said pots of each of said at least one of said modules are peat pots.

50. A combination as claimed in claim 47, wherein said pots of each of said at least one of said modules are capable of biodegrading faster than said structural base of said module.

51. A combination as claimed in claim 27, wherein said plurality of grown plants of each module comprises at least 20 plants.

52. A combination as claimed in claim 27, wherein each module has a dimension of at least 0.3 meters.

53. A modular floral arrangement as claimed in claim 1, wherein the portions of the image rendered by at least a majority of said modules are different from one another.

54. A modular floral arrangement as claimed in claim 53, wherein the portions of the image rendered by all of said modules are different from one another.

55. A modular floral arrangement as claimed in claim 1, wherein the portions of the image rendered by said modules collectively constitute an entirety of the image.

56. A modular floral arrangement as claimed in claim 1, comprising at least one non-floral visible element rendering at least one portion of the image, the at least one portion of the image rendered by the at least one non-floral visible element being visually combined with the portions of the image rendered by said modules to compose the image.

57. A modular floral arrangement as claimed in claim 56, wherein each non-floral visible element comprises at least one of a rock, a plastic element, a metallic element, a ceramic element, and a composite element.

58. A modular floral arrangement as claimed in claim 1, wherein said grown plants of a first one of said modules form a first color arrangement and said grown plants of a second one of said modules form a second color arrangement different from the first color arrangement.

59. A modular floral arrangement as claimed in claim 1, wherein said grown plants of a given one of said modules comprises different types of plants.

60. A modular floral arrangement as claimed in claim 59, wherein the different types of plants of the given one of said modules include at least three different types of plants.

61. A modular floral arrangement as claimed in claim 1, wherein the image elements formed by respective ones of said grown plants of a first one of said modules collectively make up a first part of an object depicted in the image and the image elements formed by respective ones of said grown plants of a second one of said modules collectively make up a second part of the object depicted in the image, the first one of said modules and the second one of said modules being adjacent to one another.

62. A modular floral arrangement as claimed in claim 61, wherein the object depicted in the image is one of a letter and a number.

63. A modular floral arrangement as claimed in claim 1, wherein said holding component of each module comprises a plurality of pots, each pot holding a subset of said grown plants of said module and a portion of said sustaining medium of said module.

64. A modular floral arrangement as claimed in claim 63, wherein said plurality of pots of each module is a rectangular array of pots.

65. A modular floral arrangement as claimed in claim 63, wherein said pots of each module are biodegradable.

66. A modular floral arrangement as claimed in claim 65, wherein said pots of each module are peat pots.

67. A modular floral arrangement as claimed in claim 1, wherein each module is substantially rectangular.

68. A combination as claimed in claim 27, wherein the portions of the image rendered by at least a majority of said modules are different from one another.

69. A combination as claimed in claim 68, wherein the portions of the image rendered by all of said modules are different from one another.

70. A combination as claimed in claim 27, wherein the portions of the image rendered by said modules collectively constitute an entirety of the image.

71. A combination as claimed in claim 27, comprising at least one non-floral visible element rendering at least one portion of the image, the at least one portion of the image rendered by the at least one non-floral visible element being visually combinable with the portions of the image rendered by said modules to compose the image.

72. A combination as claimed in claim 71, wherein each non-floral visible element comprises at least one of a rock, a plastic element, a metallic element, a ceramic element, and a composite element.

73. A combination as claimed in claim 27, wherein said grown plants of a first one of said modules form a first color arrangement and said grown plants of a second one of said modules form a second color arrangement different from the first color arrangement.

74. A combination as claimed in claim 27, wherein said grown plants of a given one of said modules comprises different types of plants.

75. A combination as claimed in claim 74, wherein the different types of plants of the given one of said modules include at least three different types of plants.

76. A combination as claimed in claim 27, wherein the image elements formed by respective ones of said grown plants of a first one of said modules collectively make up a first part of an object depicted in the image and the image elements formed by respective ones of said grown plants of a second one of said modules collectively make up a second part of the object depicted in the image, the first one of said modules and the second one of said modules being adjacent to one another.

77. A combination as claimed in claim 76, wherein the object depicted in the image is one of a letter and a number.

78. A combination as claimed in claim 27, wherein said holding component of each module comprises a plurality of pots, each pot holding a subset of said grown plants of said module and a portion of said sustaining medium of said module.

79. A combination as claimed in claim 78, wherein said plurality of pots of each module is a rectangular array of pots.

80. A combination as claimed in claim 79, wherein said pots of each module are biodegradable.

81. A modular floral arrangement as claimed in claim 80, wherein said pots of each module are peat pots.

82. A modular floral arrangement as claimed in claim 27, wherein each module is substantially rectangular.

83. A modular floral arrangement rendering an image and located adjacent to a road to allow occupants of vehicles travelling on the road to view the image, said modular floral arrangement comprising a plurality of modules, each module:
    rendering a portion of the image;
    comprising a plurality of plants forming image elements that collectively make up the portion of the image rendered by said module; and
    maintaining said plants of said module together as a unit before placement of said module in said modular floral arrangement and assembly of said modules to render the image,
wherein said modules are arranged such that the portions of the image rendered by said modules are visually combined to compose the image.

84. A modular floral arrangement as claimed in claim 83, wherein each module comprises:
    a sustaining medium for said plants of said module; and
    a holding component holding said sustaining medium of said module and said plants of said module.

85. A modular floral arrangement as claimed in claim 83, wherein the portions of the image rendered by at least a majority of said modules are different from one another.

86. A modular floral arrangement as claimed in claim 85, wherein the portions of the image rendered by all of said modules are different from one another.

87. A modular floral arrangement as claimed in claim 83, wherein the portions of the image rendered by said modules collectively constitute an entirety of the image.

88. A modular floral arrangement as claimed in claim 83, comprising at least one non-floral visible element making up at least one portion of the image, the at least one portion of the image made up by the at least one non-floral visible element being visually combined with the portions of the image rendered by said modules to compose the image.

89. A modular floral arrangement as claimed in claim 88, wherein each non-floral visible element comprises at least one of a rock, a plastic element, a metallic element, a ceramic element, and a composite element.

90. A modular floral arrangement as claimed in claim 83, wherein said plants of a first one of said modules form a first color arrangement and said plants of a second one of said modules form a second color arrangement different from the first color arrangement.

91. A modular floral arrangement as claimed in claim 83, wherein said plants of a given one of said modules comprises different types of plants.

92. A modular floral arrangement as claimed in claim 91, wherein the different types of plants of the given one of said modules include at least three different types of plants.

93. A modular floral arrangement as claimed in claim 83, wherein the image elements formed by respective ones of said plants of a first one of said modules collectively make up a first part of an object depicted in the image and the image elements formed by respective ones of said plants of a second one of said modules collectively make up a second part of the object depicted in the image, the first one of said modules and the second one of said modules being adjacent to one another.

94. A modular floral arrangement as claimed in claim 93, wherein the object depicted in the image is one of a letter and a number.

95. A modular floral arrangement as claimed in claim 84, wherein said holding component of each module comprises a plurality of pots, each pot holding a subset of said plants of said module and a portion of said sustaining medium of said module.

96. A modular floral arrangement as claimed in claim 95, wherein said plurality of pots of each module is a rectangular array of pots.

97. A modular floral arrangement as claimed in claim 95, wherein said pots of each module are biodegradable.

98. A modular floral arrangement as claimed in claim 84, wherein said sustaining medium of each module comprises a mixture of mineral material and organic matter.

99. A modular floral arrangement as claimed in claim 83, wherein said modular floral arrangement is placed on a slanted face of a supporting structure.

100. A modular floral arrangement as claimed in claim 99, wherein the supporting structure is a mound.

101. A modular floral arrangement as claimed in claim 83, wherein the image is a desired image to be viewed by the occupants of vehicles travelling on the road along a generally horizontal line of sight, the plants of said modules being disposed with respect to one another to create a stretched version of the desired image when said modular floral arrangement is viewed along a direction that is generally perpendicular to said modular floral arrangement.

102. A modular floral arrangement as claimed in claim 83, wherein the road is a highway.

103. A system comprising a modular floral arrangement as claimed in claim 83 and a separate sign element located adjacent to the road to allow the occupants of vehicles travelling on the road to view said separate sign element, said separate sign element conveying information about a party desirous of displaying the image.

104. A system as claimed in claim 103, wherein said separate sign element is one of a panel and a billboard.

105. A system as claimed in claim 103, wherein the information comprises a name of the party.

106. A system as claimed in claim 103, wherein the image and said separate sign element have an advertisement function.

107. A floral arrangement rendering a desired image to be viewed by an observer along a generally horizontal line of sight, the floral arrangement comprising a plurality of modules, each module comprising a viewing surface and a plurality of plants disposed at the viewing surface and arranged such as to collectively make up a portion of the desired image, wherein:
the modules are in a predetermined relationship with respect to one another such that the viewing surfaces of the modules visually unite into a collective viewing surface rendering the desired image, the collective viewing surface being at an incline with respect to a horizontal plane; and
an arrangement of the plants of the modules over the collective viewing surface creates a stretched version of the desired image when viewed by an observer looking at the collective viewing surface along a direction that is normal to the collective viewing surface, the stretched version of the desired image being a function of a degree of the incline such that, when the observer views the floral arrangement along the horizontal line of sight, the floral arrangement appears to the observer as the desired image.

108. A modular floral arrangement as claimed in claim 4, wherein the information comprises a name of the party.

109. A modular floral arrangement as claimed in claim 1, wherein said modular floral arrangement is located adjacent to a road to allow occupants of vehicles traveling on the road to view the image.

110. A modular floral arrangement as claimed in claim 109, wherein the road is a highway.

111. A modular floral arrangement as claimed in claim 61, wherein the object depicted in the image is a person or a manmade thing.

112. A modular floral arrangement as claimed in claim 111, wherein the manmade thing is a machine.

113. A modular floral arrangement as claimed in claim 61, wherein the object depicted in the image is the ground, the sky, water, the sun, or a tree.

114. A modular floral arrangement as claimed in claim 61, wherein the object depicted in the image is a logo, a sign or an emblem.

115. A modular floral arrangement as claimed in claim 1, wherein said modular floral arrangement is inclined relative to a horizontal direction and the image is to be viewed by an observer along a generally horizontal line of sight.

116. A modular floral arrangement as claimed in claim 115, wherein the grown plants of said modules are disposed with respect to one another to create a stretched version of the image when said modular floral arrangement is viewed along a direction generally perpendicular to said modular floral arrangement.

117. A combination as claimed in claim 30, wherein the information comprises a name of the party.

118. A combination as claimed in claim 27, wherein the modular floral arrangement is for location adjacent to a road to allow occupants of vehicles traveling on the road to view the image.

119. A combination as claimed in claim 118, wherein the road is a highway.

120. A combination as claimed in claim 76, wherein the object depicted in the image is a person or a manmade thing.

121. A combination as claimed in claim 120, wherein the manmade thing is a machine.

122. A combination as claimed in claim 76, wherein the object depicted in the image is the ground, the sky, water, the sun, or a tree.

123. A combination as claimed in claim 76, wherein the object depicted in the image is a logo, a sign or an emblem.

124. A combination as claimed in claim 27, wherein the modular floral arrangement is to be inclined relative to a horizontal direction and the image is to be viewed by an observer along a generally horizontal line of sight.

125. A combination as claimed in claim 124, wherein the grown plants of said modules are disposed with respect to one another to create a stretched version of the image when the modular floral arrangement is viewed along a direction generally perpendicular to the modular floral arrangement.

126. A modular floral arrangement rendering a desired image, the modular floral arrangement comprising a plurality of modules, each module:
rendering a portion of the desired image;
comprising a plurality of plants forming image elements which collectively make up the portion of the desired image rendered by the module; and
maintaining the plants of the module together as a unit before placement of the module in the modular floral arrangement and assembly of the modules to render the desired image, the modules being positioned in a predetermined relationship with respect to one another in which the portions of the desired image rendered by the modules are visually combined to compose the desired image.

127. The modular floral arrangement of claim 126, wherein the portions of the desired image rendered by adjacent ones of the modules visually merge such that the desired image is continuous across adjacent ones of the modules.

128. The modular floral arrangement of claim 126, wherein the image elements formed by respective ones of the grown plants of at least two adjacent ones of the modules visually unite into an object shown in the image.

129. The modular floral arrangement of claim 128, wherein the object is a person or a manmade thing.

130. The modular floral arrangement of claim 129, wherein the manmade thing is a machine.

131. The modular floral arrangement of claim 128, wherein the object is the ground, the sky, water, the sun, or a tree.

132. The modular floral arrangement of claim 128, wherein the object is a logo, a sign or an emblem.

133. The modular floral arrangement of claim 128, wherein the object is a letter or a number.

134. The modular floral arrangement of claim 128, wherein the object is a first object and the image elements formed by other respective ones of the grown plants of at least two adjacent ones of the modules visually unite into a second object shown in the image, the second object being different from the first object.

135. The modular floral arrangement of claim 128, wherein the at least two adjacent ones of the modules showing the object are three or more adjacent ones of the modules.

136. The modular floral arrangement of claim 126, wherein the modular floral arrangement is inclined relative to a horizontal direction and the desired image is to be viewed by an observer along a generally horizontal line of sight.

137. The modular floral arrangement of claim 136, wherein the grown plants of the modules are disposed with respect to one another to create a stretched version of the desired image when the modular floral arrangement is viewed along a direction generally perpendicular to the modular floral arrangement.

138. The modular floral arrangement of claim 126, wherein the modular floral arrangement is located adjacent to a road to allow occupants of vehicles traveling on the road to view the desired image.

139. The modular floral arrangement of claim 138, wherein the road is a highway.

140. The modular floral arrangement of claim 126, wherein the portions of the image rendered by at least a majority of the modules are different from one another.

141. The modular floral arrangement of claim 140, wherein the portions of the image rendered by all of said modules are different from one another.

142. The modular floral arrangement of claim 126, wherein the portions of the image rendered by the modules collectively constitute an entirety of the desired image.

143. The modular floral arrangement of claim 126, comprising at least one non-floral visible element making up at least one portion of the desired image, the at least one portion of the image made up by the at least one non-floral visible element being visually combined with the portions of the image rendered by the modules to compose the image.

144. The modular floral arrangement of claim 143, wherein each non-floral visible element comprises at least one of a rock, a plastic element, a metallic element, a ceramic element, and a composite element.

145. The modular floral arrangement of claim 126, wherein each module comprises:
  a sustaining medium for the plants of the module; and
  a holding structure holding together the sustaining medium of the module and the plants of the module.

146. The modular floral arrangement of claim 145, wherein the holding structure of each module comprises a plurality of pots, each pot holding a subset of the plants of the module and a portion of the sustaining medium of the module.

147. The modular floral arrangement of claim 146, wherein the plurality of pots of each module is a rectangular array of pots.

148. The modular floral arrangement of claim 146, wherein the pots of each module are biodegradable.

149. The modular floral arrangement of claim 145, wherein the sustaining medium of each module comprises a mixture of mineral material and organic matter.

150. The modular floral arrangement of claim 126, wherein the modular floral arrangement is placed on a slanted face of a supporting structure.

151. The modular floral arrangement of claim 150, wherein the supporting structure is a mound.

* * * * *